3,341,593
1-p-HYDROXYPHENYL - 2 - (β - 3',5' - DIHYDROXY-PHENYL - β - HYDROXY) - ETHYLAMINO-PROPANES
Karl Zeile, Otto Thomä, and Anton Mentrup, Ingelheim Rhine, Germany, assignors to Boehringer Ingelheim G.m.b.H., Ingelheim am Rhine, Germany, a corporation of Germany
No Drawing. Filed Nov. 27, 1963, Ser. No. 326,398
Claims priority, application Germany, Nov. 30, 1962, B 69,820
3 Claims. (Cl. 260—570.6)

This invention relates to novel diaralkylamines and acid addition salts thereof, as well as to various methods of preparing these compounds.

More particularly, the present invention relates to diaralkylamines of the formula

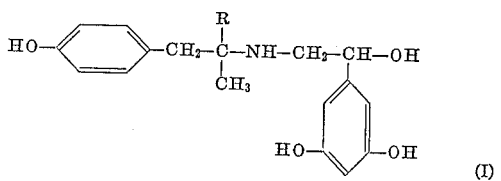

wherein R is selected from the group consisting of hydrogen and methyl, and their nontoxic, pharmacologically acceptable acid addition salts.

Since those compounds of the Formula I above wherein R is methyl contain one asymmetric carbon atom, they occur in the form of d,l-racemates, and these racemates may be separated into their optically active d- and l-isomers by customary methods. On the other hand, those compounds wherein R is hydrogen contain two asymmetric carbon atoms and therefore occur in two stereoisomeric forms A and B, which may also be separated from each other by customary methods. Each of these stereoisomers in turn occurs in the form of d,l-racemates which may again be separated into their optically active d- and l-isomers by known methods.

The compound according to the present invention may be prepared by various different methods which involved well known chemical reaction principles. However, the following methods have been found to be particularly convenient and efficient:

Method A

Reduction of a ketone of the formula

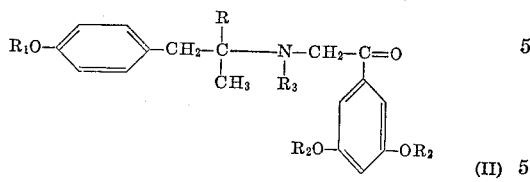

wherein $R_1$ and $R_2$ are hydrogen or protective groups which may readily be split off again by hydrolysis, hydrogenolysis or alcoholysis during or subsequent to the reduction, preferred such protective groups being acyl or benzyl; $R_3$ is hydrogen or a protective group for the amino group which can readily be split off again during or subsequent to the reduction, preferably benzyl; and R has the meanings defined above in connection with Formula I, that is, hydrogen or methyl.

The reduction of the ketone II is preferably carried out by catalytic hydrogenation in the presence of platinum, palladium or nickel as a catalyst, whereby not only the keto group is converted into a hydroxyl group, but protective groups removable by hydrogenolysis, such as benzyl, are also simultaneously removed. In the event that $R_1$ and/or $R_2$ are acyl, they remain unaffected by the catalytic hydrogenation of the keto group and may subsequently be removed by hydrolysis or alcoholysis in customary fashion.

The reduction of the keto group may also be effected by reaction of the ketone II with an alkali metal borohydride, preferably sodium borohydride.

The ketones II, which are used as starting materials in this method, may themselves be prepared by the following procedures:

(1) Reaction of a bromoketone of the formula

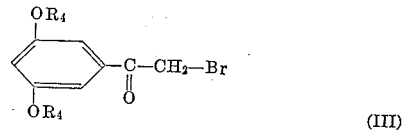

wherein $R_4$ is hydrogen or a hydroxy-protective group, such as methyl, benzyl or preferably acyl, with an amine of the formula

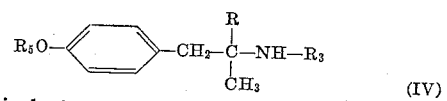

wherein $R_3$ is hydrogen or an amino-protective group, such as benzyl which is preferred, $R_5$ is hydrogen or a hydroxy-protective group, such as acyl, methyl or benzyl, and R has the same meanings as in Formula I, and removal of the hydroxy- and amino-protective groups if necessary.

(2) Reductive alkylation of an amine of the formula

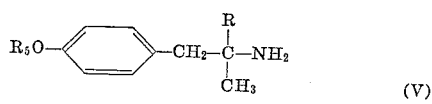

wherein R and $R_5$ have the same meanings as in Formula IV above, with a keto-aldehyde of the formula

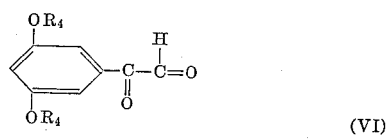

wherein $R_4$ has the same meanings as in Formula III above, and removal of the amino- and hydroxy-protective groups, if necessary.

(3) Formation of the Schiff's base from the amine V and the keto-aldehyde VI, and subsequent hydrogenation while maintaining the ketone group, the hydrogenation being preferably performed catalytically, and removal of the amino- and hydroxy-protective groups if necessary.

The sequence of the removal of the amino-protective group $R_3$, the hydroxy-protective group $R_4$ and/or $R_5$ and the reduction of the ketone group may be varied, depending upon the procedures for removal of the protective groups. If it is necessary for the removal of one or the other protective group to treat the intermediate compound with a hydrohalic acid, for instance, with hydrobromic acid in the case of the removal of the methyl group in the $R_4$ and/or $R_5$ position, this removal is advantageously performed prior to the reduction of the ketone group.

For the preparation of compounds of the Formula I wherein R is hydrogen, the following procedure may also be used:

Method B

Reductive alkylation of a compound of the formula

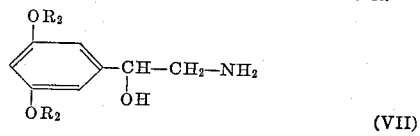

wherein $R_2$ has the same meanings as defined in Formula II, with a ketone of the formula

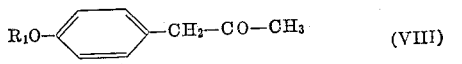

wherein $R_1$ has the same meaning as in Formula II.

The customary hydrogenation catalysts, such as palladium, platinum or nickel, may be used as catalysts for the reductive alkylation. The protective groups $R_1$ and $R_2$ may be removed simultaneously during the reductive alkylation or also subsequent thereto. The aminoalcohols VII may, for example, be obtained from the corresponding bromoketones by reaction with sodium phthalimide, saponification and reduction of the ketone.

Method C

Formation of the Schiff's base from the amine VII and the ketone VIII, and subsequent hydrogenation, which is advantageously performed catalytically.

The following examples will further illustrate the present invention and enable others skilled in the art to understand it more completely. However, it should be understood that the invention is not limited to the particular compounds illustrated in the examples below.

EXAMPLE 1

*Preparation of 1-p-hydroxyphenyl-2-($\beta$-3',5'-dihydroxyphenyl-$\beta$-hydroxy)-ethylamino-propane by Method A*

(a) *1-p-hydroxyphenyl-2-($\beta$-3',5'dihydroxy-phenyl-$\beta$-oxo)-ethylamino-propane hydrobromide.*—441 gm. (1.4 mols) of 3,5-diacetoxy-$\alpha$-bromo-acetophenone (M.P. 66° C.), prepared by bromination of 3,5-diacetoxy-acetophenone, were added to a solution of 714 gm. (2.8 mol) of 1-p-methoxyphenyl-2-benzylamino-propane in 1000 cc. of benzene, and the resulting solution mixture was refluxed for one hour. The molar excess of 1-p-methoxy-phenyl-2-benzylamino-propane precipitated out as its hydrobromide. After separation of the precipitated hydrobromide of the amino component, the hydrochloride of 1-p-methoxy-phenyl-2-($\beta$-3',5'-diacetoxyphenyl-$\beta$-oxo)-ethylbenzylamino-propane was precipitated from the reaction solution by addition of an ethanolic solution of hydrochloric acid. The precipitate was separated and, without further purification, was de-acetylated by boiling it in a mixture of 2 liters of aqueous 10% hydrochloric acid and 1.5 liters of methanol. The resulting solution was filtered through animal charcoal and, after addition of 2 liters of methanol, it was debenzylated by hydrogenation at 60° C. over palladinized charcoal as a catalyst. After removal of the catalyst by filtration, the filtrate was concentrated by evaporation, whereupon the hydrochloride of 1-p-methoxyphenyl-2-($\beta$-3',5'-dihydroxyphenyl-$\beta$-oxo)-ethylamino-propane (M.P. 244° C.) crystallized out. For the purpose of demethylation, the 350 gm. of the hydrochloride thus produced were refluxed for two hours with 3.5 liters of aqueous 48% hydrobromic acid. Upon cooling of the reaction solution, 320 gm. of 1-p-hydroxyphenyl-2-($\beta$-3',5'-dihydroxyphenyl-$\beta$-oxo)-ethylamino-propane hydrobromide (M.P. 220° C.) crystallized out.

(b) 100 gm. of the 1-p-hydroxyphenyl-2-($\beta$-3',5'-dihydroxy-phenyl-$\beta$-oxo)-ethylamino-propane hydrobromide obtained in the previous step were dissolved in hot water, and the aminoketone was isolated as the difficultly soluble sulfate by addition of an aqueous potassium sulfate solution. For the purpose of hydrogenating the keto group, 35 gm. of 1-p-hydroxyphenyl-2-($\beta$-3',5'-dihydroxyphenyl-$\beta$-oxo)-ethylamino-propane sulfate were dissolved in a mixture of 100 cc. of methanol and 100 cc. of water. After addition of a small amount of hydrochloric acid, palladium chloride and activated charcoal, the mixture was hydrogenated at 50–70° C. and at 5 atmospheres gauge. After removal of the catalyst by vacuum filtration, the filtrate was evaporated to dryness in vacuo, whereby 1-p-hydroxyphenyl-2-($\beta$-3',5'-dihydroxy-phenyl-$\beta$-hydroxy)-ethylamino-propane sulfate was obtained. The free base of the formula

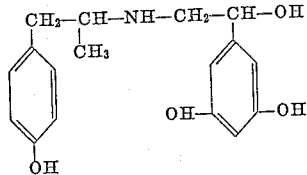

was obtained from the sulfate by addition of an aqueous sodium bicarbonate solution and shaking of the mixture with ethylacetate. The hydrochloride of this compound (M.P. 182–183° C.) was obtained by adding an ethereal solution of hydrochloric acid to the free base.

EXAMPLE 2

*Preparation of 1-p-hydroxyphenyl-2-($\beta$-3',5'-dihydroxyphenyl-$\beta$-hydroxy)-ethylamino-propane hydrobromide by Method A*

220 gm. of 1-p-hydroxyphenyl-2-($\beta$-3',5'-dihydroxyphenyl-$\beta$-oxo)-ethylamino-propane hydrobromide were dissolved in 1 liter of methanol, the resulting solution was boiled with activated charcoal, the charcoal was filtered off and the filtrate was hydrogenated in the presence of Raney nickel at 60° C. and 5 atmospheres gauge. Thereafter, the catalyst was filtered off, the methanolic solution was admixed with a small amount of concentrated hydrobromic acid, and the mixture was evaporated to dryness in vacuo. The residue was stirred with acetone, the mixture was vacuum filtered and the filter cake was recrystallized from a mixture of methanol and ether. The 1-p-hydroxyphenyl-2-($\beta$-3',5'-dihydroxyphenyl-$\beta$-hydroxy)-ethylamino-propane hydrobromide thus obtained had a melting point of 222–223° C.

*Analysis.*—Calculated: Br, 20.79%; N, 3.65%. Found: Br, 20.85%; N, 3.66%.

EXAMPLE 3

*Preparation of 1-p-hydroxyphenyl-2-($\beta$-3',5'-dihydroxyphenyl-$\beta$-hydroxy-ethylamino-propane and its hydrochloride by Method B*

A mixture of 8.45 gm. (0.05 mol) of 1-(3',5'-dihydroxyphenyl)-1-hydroxy-2-amino-ethane and 9 gm. (0.06 mol) of p-hydroxyphenyl acetone was added to 150 cc. of methanol, 3 gm. of glacial acetic acid were added thereto, and the resulting mixture was hydrogenated in the presence of platinum under normal conditions. After the absorption of hydrogen was complete, the catalyst was removed by vacuum filtration, an aqueous sodium bicarbonate solution was added to the filtrate and the 1-p-hydroxyphenyl-2-($\beta$-3',5'-dihydroxyphenyl-$\beta$-hydroxy)-ethylamino-propane formed thereby was taken up in ethyl acetate. The addition of an ethereal solution of hydrochloric acid to this ethyl acetate solution led to the precipitation of the hydrochloride of the base, which crystallized upon treatment with a mixture of acetonitrile and ether (M.P. 183° C.).

EXAMPLE 4

*Preparation of 1-p-hydroxyphenyl-2-methyl-2-($\beta$-3',5'-dihydroxyphenyl-$\beta$-hydroxy)-ethylamino-propane hydrobromide by Method A*

(a) 40 gm. (0.186 mol) of 3,5-dimethoxyphenylglyoxal-hydrate were dissolved in a mixture of benzene and methanol, and 28.0 gm. (0.155 mol) of 1-phenyl-2-methyl-2-amino-propane were added to the solution, and the resulting mixture was refluxed for half an hour. Thereafter, the benzene/methanol solvent was distilled off, the residue was dissolved in methanol which contained 5.7 gm. of hydrochloric acid (0.155 mol), and the solution was hydrogenated in the presence of palladinized charcoal at atmospheric pressure accompanied by warming. After the absorption of hydrogen was complete, the catalyst was removed by vacuum filtration, a portion of the solvent was distilled off, the concentrated solution was allowed to cool, and the hydrochloride of 1-p-methoxyphenyl-2-methyl-2-(β-3′,5′-dimethoxyphenyl-β-oxo)-ethylamino-propane was precipitated therefrom by addition of ether. The yield was 54% of theory. After recrystallization from ethanol, the product had a melting point of 192° C.

(b) For demethylation of the aminoketone prepared in the previous step, 30 gm. of the 1-p-methoxyphenyl-2-methyl-2-(β-3′,5′-dimethoxy-β-oxo)-ethylamino-propane hydrochloric were dissolved in a mixture of 200 cc. of aqueous 66% hydrobromic acid and 100 cc. of water, and the solution was refluxed for two hours. The reaction mixture was then cooled and the precipitate formed thereby was removed by vacuum filtration. The filter cake was washed with water, dried and redissolved in methanol. The methanolic solution was treated twice with activated charcoal, and then the hydrobromide of 1-p-hydroxyphenyl-2-methyl-2-(β-3′,5′-dihydroxyphenyl-β-oxo)-ethylamino-propane was precipitated from the methanolic solution by addition of ether. The yield was 90% of theory. The hydrobromide thus obtained had a melting point of 257° C. (decomposition).

(c) 46 gm. of the hydrobromide obtained in the previous step were dissolved in 400 cc. of methanol, and the solution was hydrogenated with Raney nickel at a pressure of 5 atmospheres gauge and a temperature of about 60° C. Thereafter, the methanol solvent was distilled off and the residue was crystallized with a mixture of glacial acetic acid and acetonitrile.

Yield: 50% of theory. The hydrobromide of 1-p-hydroxyphenyl-2-methyl-2-(β-3′,5′-dihydroxyphenyl-β-hydroxy)-ethylamino-propane of the formula

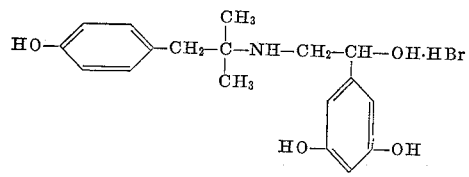

thus obtained had a melting point of 184–186° C.

EXAMPLE 5

*Separation of the hydrobromide of 1-p-hydroxyphenyl-2-(β-3′,5′-dihydroxyphenyl-β-hydroxy)-ethylamino-propane into its stereoisomeric components*

360 gm. of the 1-p-hydroxyphenyl-2-(β-3′,5′-dihydroxyphenyl-β-hydroxy)-ethylamino-propane hydrobromide obtained in Example 2 were recrystallized several times from glacial acetic acid. 180 gm. of the stereoisomeric form A of the hydrobromide were obtained, which had a melting point of 224.5–226° C.

The stereoisomeric form B of the hydrobromide, which had a melting point of 188–190° C., was obtained by treating the concentrated mother liquors of the glacial acetic acid recrystallization step with acetonitrile.

The compounds according to the present invention, that is, the racemic, optically active and stereoisomeric forms of the diaralkylamines of the Formula I and their non-toxic, pharmacologically acceptable acid addition salts, have useful pharmacodynamic properties. More particularly, they exhibit broncho-spasmolytic activities and are characterized especially by great stability, especially against oxidative action. Hence, they are administerable perorally as well as parenterally, including by inhalation. Further, they are rapidly and readily absorbed from the gastro-intestinal tract of warm-blooded animals, and maintain a long duration of effective action. Their side effects upon the heart and the blood pressure are very weak, which is particularly noteworthy because known compounds of similar structure produce an undesirable significant side effect upon the heart rate and the blood pressure. More specifically, the compounds of the present invention produce positive inotropic and positive chronotropic effects on the heart and distinct, although slight, hypotension.

Typical examples of pharmacologically acceptable, non-toxic acid addition salts are their hydrochlorides, hydrobromides, sulfates, phosphates, nitrates, acetates, propionates, butyrates, valerates, oxalates, malonates, succinates, maleates, fumarates, lactates, tartrates, citrates, malates, benzoates, phthalates, cinnamates, salicylates, nicotinates, furoate, 8-chlorotheophyllinates, and the like. The hydrobromides and hydrochlorides, however, are preferred.

For therapeutic purposes the compounds of the invention are administered in the form of dosage unit compositions consisting essentially of an inert, physiologically compatible carrier and one dosage unit of the active ingredient, such as tablets, hypodermic solutions, inhalation solutions and aerosols, and the like.

The individual dosage unit ranges of the compounds according to the present invention are 0.5–30 mgm. per os and 0.05–5 mgm. subcutaneously or intromuscularly, and their concentration in inhalation solutions may range from 0.1 to 10% by weight.

For instance, the average therapeutically effective single dosage range of the stereoisomeric form A of d,l-1-p-hydroxyphenyl-2-(β-3′,5′-dihydroxyphenyl-β-hydroxy)-ethyl-aminopropane is 0.5–5 mgm. per os; for administration by the subcutaneous or intramuscular route the average effective single dosage range of the same compound is 0.05–1 mgm. The effective concentration range of the compound in an inhalation solution is from 0.1 to 2% by weight.

The following examples illustrate various dosage unit compositions comprising a compound of the present invention as the active broncho-spasmolytic ingredient. The parts are parts by weight unless otherwise specified.

EXAMPLE 6

*Inhalation aerosol*

The aerosol composition is compounded in customary fashion from the following ingredients:

| | Parts |
|---|---|
| Stereoisomeric form A of d,l-1-p-hydroxyphenyl-2-(β-3′,5′-dihydroxyphenyl-β-hydroxy)-ethyl-amino-propane hydrobromide | 0.15 |
| Soybean-lecithin | 0.05 |
| Propellent gas mixture (Frigen 11, 12 and 114) q.s. ad | 100.00 |

EXAMPLE 7

*Inhalation solution*

The solution is compounded from the following ingredients:

| | Parts |
|---|---|
| Stereoisomeric form A of d,l-1-p-hydroxyphenyl-2-(β-3′,5′-dihydroxyphenyl-β-hydroxy)-ethyl-amino-propane hydrobromide | 1.00 |
| Sodium pyrosulfite | 0.05 |
| Disodium salt of E.D.T.A. | 0.05 |
| Distilled water, q.s. ad | 100.00 |

The solution is dispensed through an inhalation vaporizer.

EXAMPLE 8

*Tablets*

The tablet composition is compounded from the following ingredients:

| | Parts |
|---|---|
| Stereoisomeric form A of d,l-1-p-hydroxyphenyl-2-(β-3′,5′-dihydroxyphenyl-β-hydroxy)-ethyl-amino-propane hydrobromide | 5.0 |
| Corn starch | 55.0 |
| Secondary calcium phosphate | 100.0 |
| Lactose | 30.0 |
| Colloidal silicic acid | 5.0 |
| Stearic acid | 1.0 |
| Solumble starch | 4.0 |
| Total | 200.0 |

The individual ingredients are homogeneously admixed, and the composition is pressed into tablets weighing 200 mgm. each.

EXAMPLE 9

*Hypodermic solution*

The solution is compounded from the following ingredients:

| Ingredient | Parts |
|---|---|
| Stereoisomeric form A of d,l-1-p-hydroxyphenyl-2-($\beta$-3',5'-dihydroxyphenyl-$\beta$-hydroxy)-ethyl-amino-propane hydrobromide | 0.250 |
| Sodium pyrosulfite | 0.100 |
| Disodium salt of E.D.T.A. | 0.500 |
| Sodium chloride | 8.500 |
| Double-distilled water, q.s. ad (by volume) | 1000.000 |

The solution composition is filled into 1 cc. ampules, which are then sterilized and sealed. Each ampule contains .25 mgm. of the active ingredient.

While the preceding dosage unit composition examples illustrate only one of the compounds of the present invention as an active ingredient, it should be understood that any of the other compounds embraced by Formula I or their nontoxic, pharmacologically acceptable acid addition salts may be substituted for the single illustrated compound. Also, the illustrated active ingredient content may be varied within the above indicated dosage unit ranges to meet particular requirements.

Although the present invention has been illustrated with the aid of certain specific embodiments, it will be readily apparent to others skilled in the art that the invention is not limited to these particular embodiments and that various changes and modifications may be made without departing from the spirit of the invention or the scope of the appended claims.

What is claimed is:

1. A compound selected from the group consisting of 1-p-hydroxyphenyl-2-($\beta$-3',5'-dihydroxyphenyl-$\beta$-hydroxy)-ethylamino-propane, its stereoisomers, its racemates, its optical antipodes and nontoxic, pharmacologically acceptable acid addition salts of said racemates, stereoisomers and optical antipodes.

2. The stereoisomeric form A of d,l-1-p-hydroxyphenyl-2-($\beta$-3',5'-dihydroxyphenyl-$\beta$-hydroxy)-ethylamino-propane hydrobromide having a melting point of 224.5 226° C.

3. The stereoisomeric form B of d,l-1-p-hydroxyphenyl-2-($\beta$-3',5'-dihydroxyphenyl-$\beta$-hydroxy)-ethylamino-propane hydrobromide having a melting point of 188–190° C.

References Cited

UNITED STATES PATENTS

| | | | |
|---|---|---|---|
| 3,135,797 | 6/1964 | Biel | 260—570.6 |

FOREIGN PATENTS

| | | |
|---|---|---|
| 542,265 | 4/1956 | Belgium. |
| 623,286 | 7/1961 | Canada. |
| 789,033 | 1/1958 | Great Britain. |

OTHER REFERENCES

Moed et al., "Rec. Trav. Chim." vol 74, pages 921–24 (1955).

CHARLES B. PARKER, *Primary Examiner.*

R. V. HINES, *Assistant Examiner.*